May 16, 1961

J. B. RUSSELL 2,983,951

CURING OVEN

Filed June 16, 1959

James B. Russell
INVENTOR.

BY *Clarence A. O'Brien*
*and Harvey B. Jacobson*
Attorneys

May 16, 1961  J. B. RUSSELL  2,983,951
CURING OVEN

Filed June 16, 1959

James B. Russell
INVENTOR.

BY *Clarence A. O'Brien*
*and Harvey B. Jacobson*
Attorneys

United States Patent Office 2,983,951
Patented May 16, 1961

2,983,951

CURING OVEN

James B. Russell, 17208 Autumn Drive, La Puente, Calif., assignor of fifty percent to Charles M. Hall Filed June 16, 1959, Ser. No. 820,756

9 Claims. (Cl. 18—6)

This invention relates to a curing oven and more particularly to a curing oven for a large variety of articles, particularly electrical connectors.

A curing oven constructed in accordance with this invention employs a variable diameter gate which distinguishes the oven from ordinary ovens and which makes possible the use of the same curing oven and the same gate for a very wide variety of diameter conductors.

A very important feature of the invention is the gate, and it is to be understood at the outset that this gate is described in conjunction with the curing oven but has numerous diverse applications in the same general field of endeavor and in very remote fields. It is believed that the gate constructed in accordance with the invention is unique and improves not only ordinary curing ovens but also furnishes a gate of variable diameter which may be used as a snugging or holding device for cables, hoses, wires, tubes, pipes, etc. or as a brake for any elongate object which is moved therethrough.

The gate has a pair of gate members which are swung on pivots and which are preferably, but not necessarily, spring loaded by torsion or other types of springs. The gates are capable of swinging to an open position, but due to the shape of the throat in the gate, as the gate opens the throat diameter varies in accordance with the curvature of the surfaces of the gate members and presents to the elongate object moving through the gate a smooth properly proportioned throat area making contact with the elongate object through a range of the complete 360° around the object.

Another object of the invention is to provide a curing oven with a unique gate together with a connector holder which is separably mounted in the oven and which cooperates to hold the connector in a proper position within the oven to cure the potting material in the connector. This is a distinct improvement over current curing methods used for the potting material in conventional connectors.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
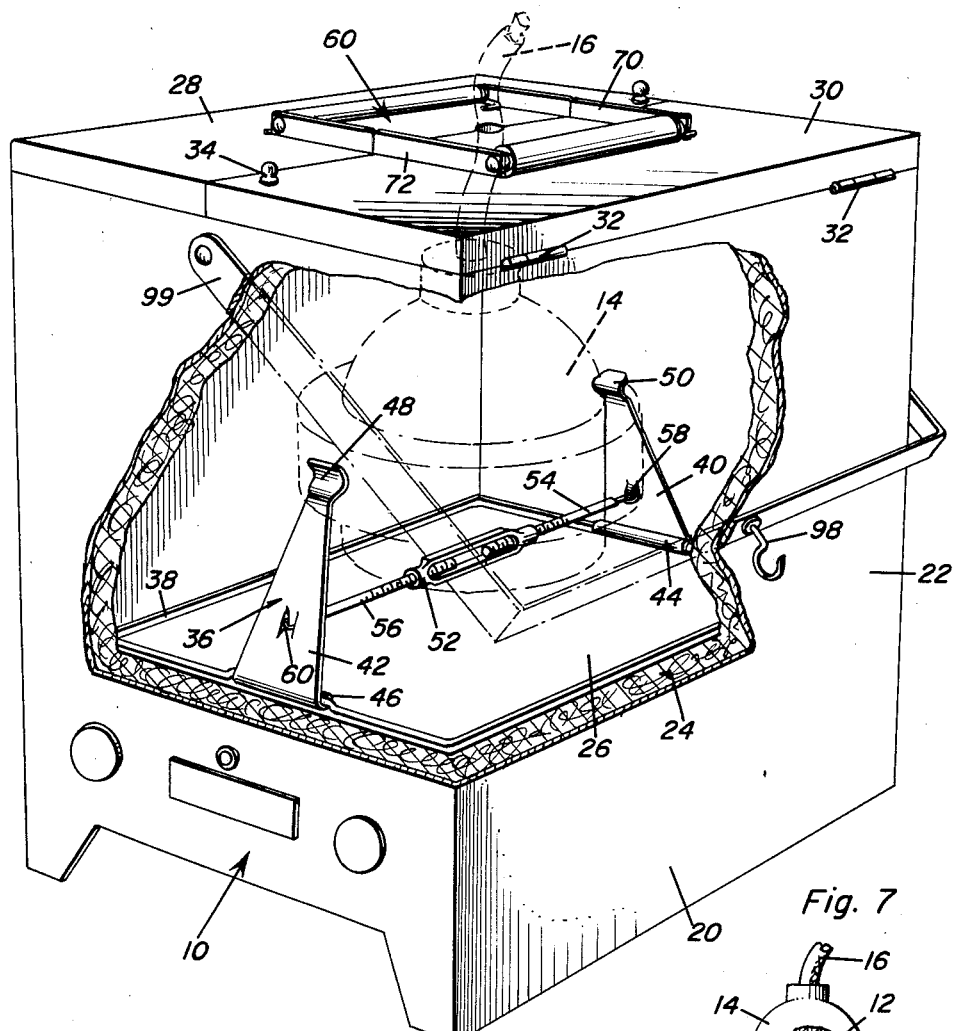
Figure 1 is a perspective view of an oven constructed in accordance with the invention, parts being broken away to illustrate otherwise hidden details, there being a typical connector shown in phantom in the holder within the oven.
Figure 7:
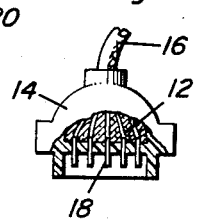
Figure 7 is a fragmentary elevational view, parts being broken away and in section, disclosing one possible conventional connector wherein the potting material thereof may be cured in the oven of Figure 1.

In the accompanying drawings there is an oven 10 exemplifying the principles of the invention. The oven is used to cure the potting material 12 in a conventional connector 14. It is emphasized that connector 14 is conventional, and as such diagrammatically represents any type of connector or other object wherein the potting material or some other part thereof requires curing. Conventional connector 14 is a small connector used in electrical circuits, and it has a conductor 16 connected with it. The conductor has the wires thereof secured to a number of prongs 18, and the potting material 12 surrounds the inner ends of the prongs, the wire junctures with the prongs and portions of the wires.

Oven 10 is made of a casing 20 having side walls 22 of double thickness with insulation 24 therebetween. The chamber 26 of the oven, therefore, is insulated. The heater of the oven is conventional and is not shown and the same holds true for the heater controls. Ordinarily the heater will be electrically energized and the controls will include a complement of conventional parts such as a switch and a thermostat, timer, signal light, etc.

The upper end of the casing 20 is open and there are double doors 28 and 30 connected by hinges 32 to the upper edges of a pair of the side walls 22. Latch 34 is operatively connected with one or both of the doors 28 and 30 and retains the doors in the latched position after connector 14 is placed in the oven chamber 26.

Holder 36 is an optional feature. It is composed of a rectangular wire frame 38 and a pair of clamp members 40 and 42 connected by hinges 44 and 46 to opposite sides of square or rectangular frame 38. Grippers 48 and 50 are at the upper ends of the clamp members 40 and 42 to complete the clamp. The grippers are adapted to engage opposite parts of the connector 14 and hold it suspended in oven chamber 26. There are means for applying a compressive force against the opposite parts of connector 14 by drawing clamp members 40 and 42 together. These means may be in the form of an ordinary turnbuckle 52 with threaded rods 54 and 56 extending therefrom and connected by pivots 58 and 60 to clamp members 40 and 42 intermediate the upper and lower ends thereof.

Reference is now made principally to Figures 2–6 showing the gate construction. Gate 60 is made of two gate sections 62 and 64, each of which is identical in construction and mounting. Doors 28 and 30 have a central aperture 66 within which gate 60 is mounted. A pair of upstanding flanges 70 and 72, each of which is sectional with parts thereof attached to the respective doors 28 and 30, support spindles 74 and 76 which extend between flanges 70 and 72. Torsion springs 78 and 80 are concentrically mounted on spindle 74, and there are torsion springs 82 and 84 concentrically mounted on spindle 76. The outer end of each torsion spring is provided with a hook in engagement with the flanges 70 and 72, and the inner ends of the torsion springs are seated on portions of the gate sections 62 and 64 so that the bias of the torsion springs is in a direction to hold the gates in a closed position at which the confronting edges thereof meet and extend approximately horizontally across the opening 66.

Typical gate section 64 has edge 90 with a semi-circular recess 91 intermediate its ends. The edge of recess 91 is sharp or reasonably sharp, and the material forming section 62 is progressively thicker (Figure 3) when viewed in cross-section, and approaching the hinged edge of section 64. For the purposes of description it is assumed that this direction is an X axis and that a direction perpendicular thereto but coplanar therewith would be a Y axis. The thickness of the section 64 increases at a greater rate along Y axes which would extend from edge 91 (Figure 3) and which would progress to the hinged edge of the gate section 64.

Figure 6:
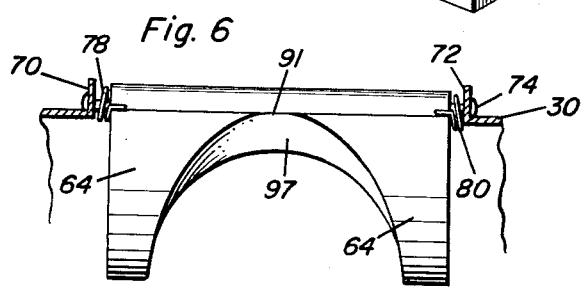
Figure 6 is a sectional view taken on the line 6—6 of Figure 3.
Figure 2:
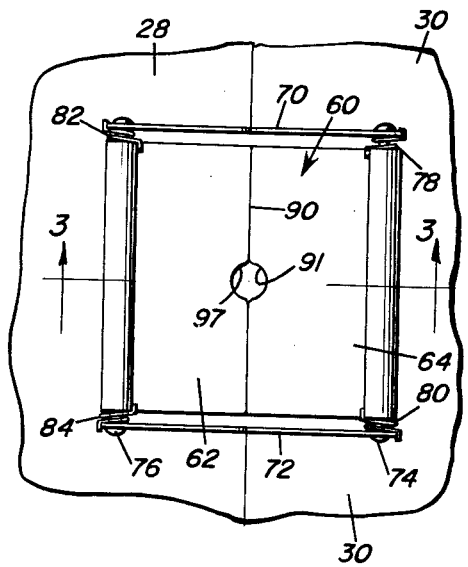
Figure 2 is a fragmentary top view of the gate in the oven of Figure 1.
Figure 3:
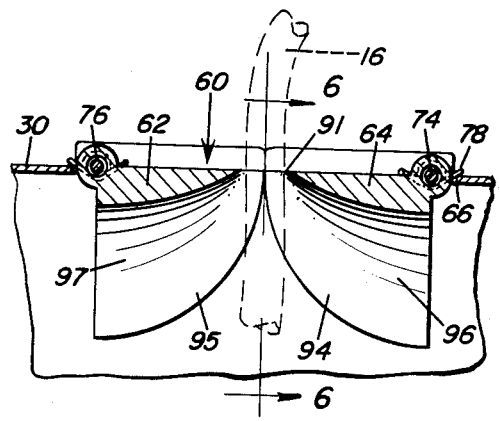
Figure 3 is a sectional view taken on the line 3—3 of Figure 2, showing the gate in a rest position having a minimum diameter opening.
Figure 5:
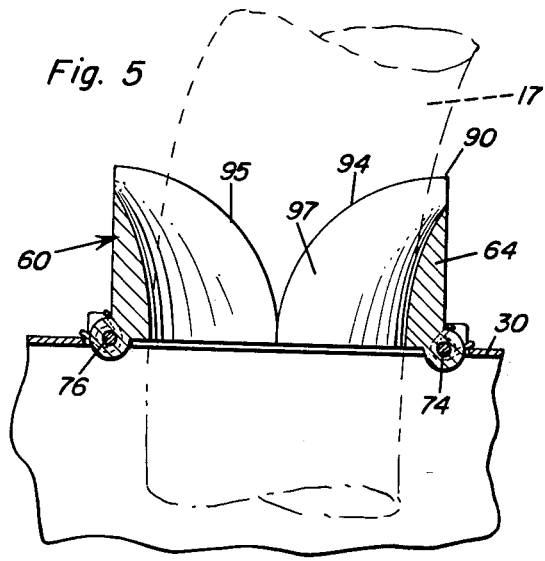
Figure 5 is a sectional view taken on the line 5—5 of Figure 4.
Figure 4:
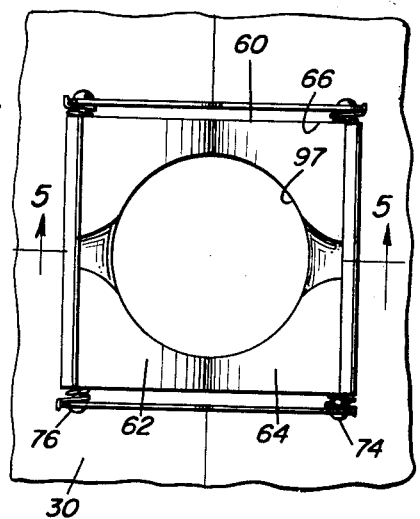
Figure 4 is a bottom view of the gate in Figure 3, in its other position having a maximum opening.

In further description, attention is invited to Figure 6. When viewed from edge 90, the lower surface of the section 64 is formed as an arch or tunnel. However, the upper edge of the arch is very thin at recess 91 and thickens gradually as the arch approaches the hinged edge of section 64.

In further description, cross-sections of gate section 64 in a direction parallel to the hinge axis, would have lower surface portions of variable reduced cross-section in the approximate shape of a parabola. However the parabolic surface portions would become increasingly shallow from edge 91 toward the hinged edge of the gate section 64.

With the gate constructed as described, there are defined adjacent arcuate surfaces or edges 94 and 95 for each side of each tunnel 96 and 97 in sections 64 and 65. The arcuate edges 94 and 95, therefore, are in pairs and when the gate sections are swung to the open position to accommodate different diameter conductors 16 or 17 (Figure 5) the edges 94 and 95 contact each other throughout the entire operating range of the gate sections so that the parabolic surface portions form circular passageways 97 of a diameter to match the diameter of the conductor 16, 17 or any other conductor.

To use the oven connector 14 is disposed as described previously in chamber 26 and it is cured by heating. Upon removal it is simply taken from the oven. However, the conductor 16 attached to connector 14 is received in a snugly fitting passageway 97 regardless of the diameter of the conductor 16.

It is to be understood that various changes and modifications may be made without departing from the invention. For instance, handle 99 may be pivoted to the oven to facilitate carrying the oven from one place to the other, and the handle may be equipped with a hook 98 for further convenience. Other such modifications as fall within the scope of the following claims and all uses as briefly referred to herein or as will become readily apparent to those skilled in many arts, may be restored to without departing from the claims.

What is claimed as new is as follows:

1. A variable gate comprising a pair of gate sections, said sections having means at their distant edges for mounting the sections for hinged movement, said sections having confronting surfaces in constant sealing contact with each other, said surfaces each provided with a varying diameter recess to form an opening varying in size in response to hinged movement of the gate sections, and constituting a throat through which a conductor or the like may pass.

2. A variable gate comprising a pair of gate sections, said sections having means at their distant edges for mounting the sections for hinged movement, said sections having confronting surfaces in constant sealing contact with each other, said surfaces each provided with a varying diameter recess to form an opening varying in size in response to hinged movement of the gate sections, and constituting a throat through which a conductor or the like may pass, said recess having edges which are brought together to form always uniform diameter passageways notwithstanding the extent to which the gate sections are opened.

3. A variable gate comprising a pair of gate sections, said sections having means at their distant edges for mounting the sections for hinged movement, said sections having confronting surfaces in constant sealing contact with each other, said surfaces each provided with a varying diameter recess to form an opening varying in size in response to hinged movement of the gate sections, and constituting a throat through which a conductor or the like may pass, said recess having edges which are brought together to form always uniform diameter passageways notwithstanding the extent to which the gate sections are opened, resilient means reacting on said gate sections to urge said gate sections to a rest position at which the diameter of said passageway is a minimum diameter.

4. In combination with the gate of claim 3, a curing oven having walls on the sides thereof and a top closure in which said gate is disposed.

5. The combination of claim 4, wherein there is an electrical connector holder separably mounted in said curing oven and adapted to support an electrical connector whose conductor is adapted to pass through said passageway of said gate.

6. A gate providing a variable diameter throat within which an elongate object may be accommodated, said gate including a pair of hinged gate sections having confronting edges abutting each other, said gate sections each having lower identical surfaces, said surfaces of said gate sections providing alined tunnels which are of a minimum thickness at the adjacent edges of said gate sections and which progress in thickness gradually toward the hinged edges of said gate sections, said tunnels thereby forming the variable diameter throat.

7. A gate providing a variable diameter throat within which an elongate object may be accommodated, said gate including a pair of hinged gate sections having confronting edges abutting each other, said gate sections each having lower identical surfaces, said surfaces of said gate sections providing alined tunnels which are of a minimum thickness at the adjacent edges of said gate sections and which progress in thickness gradually toward the hinged edges of said gate sections, the lower edges of said tunnels being arcuate so that when said gate sections are swung pivotally said arcuate edges match each other and thereby provide a closed circular passageway defined by the surfaces of said tunnels at all positions of pivotal adjustment of said gate sections.

8. In combination with the gate of claim 7, a curing oven having an opening therein, and said gate accommodating said opening so that the elongate object in said passageway may extend into the chamber of said oven.

9. The combination of claim 8, wherein there is a holder separably mounted in the chamber of said oven and adapted to support the object that is being cured within the oven and which has the elongate object extending through said gate.

References Cited in the file of this patent

UNITED STATES PATENTS

| 221,162   | Edelen        | Nov. 4, 1879  |
| 2,136,566 | Schnecko et al. | Nov. 15, 1938 |
| 2,908,035 | De Haan       | Oct. 13, 1959 |